(12) United States Patent
Bottum et al.

(10) Patent No.: US 9,251,264 B2
(45) Date of Patent: *Feb. 2, 2016

(54) SYSTEMS AND METHODS FOR ENABLING AN ELECTRONIC GRAPHICAL SEARCH SPACE OF A DATABASE

(71) Applicant: Swoop Search, LLC, Stillwater, MN (US)

(72) Inventors: Quinn Colton Bottum, Stillwater, MN (US); Michael Christopher Bottum, East Troy, WI (US); Paul William Bottum, Stillwater, MN (US)

(73) Assignee: Swoop Search, LLC, Stillwater, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,477

(22) Filed: Jan. 22, 2015

(65) Prior Publication Data
US 2015/0186522 A1    Jul. 2, 2015

Related U.S. Application Data

(63) Continuation of application No. 14/179,253, filed on Feb. 12, 2014, now Pat. No. 8,972,395.

(60) Provisional application No. 61/896,294, filed on Oct. 28, 2013.

(51) Int. Cl.
*G06F 17/30* (2006.01)
(52) U.S. Cl.
CPC ............................... *G06F 17/30864* (2013.01)
(58) Field of Classification Search
CPC .......... G06F 17/30398; G06F 17/3053; G06F 17/30554; G06F 17/30274; G06F 17/30277; G06F 17/30864; G06F 17/30967; G06F 17/30994

USPC .................. 707/769, 728, 999.003, 999.005; 345/157; 715/856, 968
See application file for complete search history.

(56) References Cited

U.S. PATENT DOCUMENTS

| | | | |
|---|---|---|---|
| 2004/0019588 A1* | 1/2004 | Doganata et al. | 707/3 |
| 2007/0132727 A1* | 6/2007 | Garbow et al. | 345/157 |
| 2007/0192305 A1* | 8/2007 | Finley et al. | 707/4 |
| 2007/0288498 A1* | 12/2007 | Dietz et al. | 707/102 |
| 2008/0152231 A1* | 6/2008 | Gokturk et al. | 382/209 |
| 2008/0177714 A1* | 7/2008 | Garbow et al. | 707/3 |
| 2008/0177735 A1* | 7/2008 | Garbow et al. | 707/5 |

(Continued)

*Primary Examiner* — Dennis Truong
(74) *Attorney, Agent, or Firm* — Bookoff McAndrews, PLLC

(57) ABSTRACT

A computer-implemented method is provided for enabling Internet users to interact with a graphical search interface by: generating a multi-dimensional search space having a plurality of vertices, based on the initial and related search parameters, wherein each vertex is populated with and represents one of the initial or related search parameters; generating a matrix of hyperlinks within the multi-dimensional search space, each hyperlink having coordinates within the search space defining a relevance of the hyperlink to each of the initial and related search parameters; displaying a graphical interface projecting the multi-dimensional search space, along with user elements by which the user may adjust a relative weight of one or more of the initial and related search parameters by interacting with one or more of the hyperlinks; and displaying a plurality of search results automatically updated in real time based on the user-adjusted weights of the initial and related search parameters.

19 Claims, 9 Drawing Sheets

(56) References Cited

U.S. PATENT DOCUMENTS

2010/0082662 A1* 4/2010 Taylor et al. .................. 707/769
2011/0145232 A1* 6/2011 Chang et al. .................. 707/728
2013/0218886 A1* 8/2013 Graham et al. ............... 707/728
2013/0275429 A1* 10/2013 York et al. .................... 707/737

* cited by examiner

SYSTEMS AND METHODS FOR ENABLING AN ELECTRONIC GRAPHICAL SEARCH SPACE OF A DATABASE

PRIORITY

This application is a continuation of U.S. patent application Ser. No. 14/179,253, filed Feb. 12, 2014 (now, allowed), which claims the benefit of priority to U.S. Provisional Application No. 61/896,294, filed Oct. 28, 2013, both of which are herein incorporated by reference in their entireties.

TECHNICAL FIELD

The present disclosure is directed towards providing an intuitive means of representing and manipulating the weightings of search parameters employed by database search algorithms.

BACKGROUND

That we are awash in information is an often used, though certainly correct axiom of the early 21st century. The ubiquity of information access portals in everyday life provides the potential for connecting meaning to any experience or data set. Potential meaning is the key tenant here. How information sets are evaluated sorted and searched, remains the ultimate determinant of their actual value to the user.

Information in this modern sense may be considered as a two component entity; the first being the actual data it embodies, the second being its accessibility, based on identifying tags, anchors, or fields.

The exponential increases in both data production and storage capabilities have matched, not surprisingly, very well since "Moore's Law" tales have circulated through computational communities. Data search technologies, how information is sorted and accessed, however, have experienced a much more varied history. Though the success of market leaders' search algorithms, such as Google's "page-rank," belie their effectiveness, the increasing volume and complexity of modern information structure has led to increased user dissatisfaction and frustration. Three significant points of current search algorithm dissatisfaction are search output discrepancies, search output bias, and an incongruous match of search interface with brain heuristic functioning.

Search output discrepancies may result from a circumstance referred to as the "local search problem." This problem arises when global data sets containing extrinsic information are not consistently cross checked or "curated" with local data sets containing intrinsic information. For example, a search for vacation destinations may yield inconsistent output if not updated with local information such as prices, business hours and patron ratings.

Search output bias may result primarily from two causes; either because of discontinuities in search parameters weightings between the user, and the search algorithm, or because of misguiding parameter weightings through "search engine optimization" practices. In either case, miscommunication or lack of clear communication between user input and search algorithm programming may skew output away from the user's intentions.

As search engine and social networking leaders battle the concept of truth and validity on the internet, a potential problem looms for society as a whole. The popularity of social networking sites has made searching within peer preference databases very effective and appealing. A search conducted within a social network database consisting of peers with similar preferences (intrinsic data) is highly likely to produce user preferable results. Such a behavior, however, limits variation by culling preference outliers. As in biology, any system lacking diversity, while successful within its native context, is resistant to change, slow to adapt, and quickly expends its resources.

Finally, search is a process to learn. Psychological studies of our mind's processing methods maintain that we interpret and organize stimuli based on heuristic schemas. These heuristic schemas contain impressions and rules of thumb that are based on our collective experiences. Commonly statistical methodologies are utilized to explain the occurrence of an activity(s), a decision(s), or a behavior(s). A common form of explanation through statistical measurement is through the use of multivariate mathematical modeling. Within the mathematical models it is very common to have 2-4 variables that explain the vast majority of the phenomenon under investigation. When we form opinions or judgments, we commonly utilize a couple of variables that form the heuristic schema that guide our decision making for a given decision topic.

To better match the processing methodology of our brain, an enhanced method and interface of search will enable a quicker, more sensitive, and more exhaustive search process. Currently, search is guided by a serial step by step process. Each step produces a list of results based on one dimension or variable guiding the search command interface. In order to match our minds' organized discovery process and experiential store of knowledge, the search interface could allow the simultaneous expression of multi-dimensional discovery or reasoning. The search process could be expressed as a coordinate within an area that is bound by the multi-dimensional vectors that represent the most important characteristics that involve the topic under investigation. Each vector is a mathematical expression denoting a combination of magnitude and direction. Based on the number of variables that are utilized to characterize the topic under investigation, the area of intersection between the vectors can range from uni-dimensional vector reflection to a multi-dimensional area of expression. We can use a coordinate within the range or area of expression to strengthen or reduce the importance of a variable under investigation. This toggling of coordinate placement allows the search process to maintain a view that simultaneously engages the critical characteristics that govern an intended inquiry.

Through this process the view of search will more closely match the heuristic management of new stimuli. It allows a more graphical representation of the multi-dimensional decision making process. It should speed the search process by maintaining a multi-dimensional view of the critical characteristics that are intended to guide the search. It may also enable a more exhaustive search due to the graphical sensitivity.

There exists an apparent need for an interface between user and search algorithms which would allow the joining of discontinuous data sets, an intuitive means of user awareness and manipulation of search parameter weightings, as well as an effective means of searching across intrinsic and extrinsic data sets. The foregoing general description and the following detailed description are exemplary and explanatory only and are not restrictive of the disclosure.

SUMMARY

According to certain embodiments of the present disclosure, a computer-implemented method is provided for enabling Internet users to interact with a graphical search interface, the method including: receiving, from a user over an electronic network, an initial search parameter; identifying, using a search engine database, a plurality of related search parameters, based on the received initial search parameter; generating, by a processor, a multi-dimensional search space, based on the initial and related search parameters, wherein the multi-dimensional search space has a perimeter defined by the initial and related search parameters; generating, by a processor, a matrix of hyperlinks within the multi-dimensional search space, each hyperlink having coordinates within the search space defining a relevance of each hyperlink to the initial and related search parameters; transmitting, for display to the user over the network, a graphical interface projecting the multi-dimensional search space, along with one or more user elements by which the user may adjust a relative weight of one or more of the initial and related search parameters by interacting with one or more of the hyperlinks; and transmitting, for display to the user over the network, a plurality of search results automatically updated in real time based on the user-adjusted weights of the initial and related search parameters.

According to additional embodiments of the present disclosure, a computer-implemented method is provided for enabling Internet users to interact with a graphical search interface, the method including: receiving, from a user over an electronic network, an initial search parameter; generating, using a search engine database, a plurality of related search parameters, based on the received initial search parameter; generating, by a processor, a multi-dimensional search space having a plurality of vertices, based on the initial and related search parameters, wherein each vertex is populated with and represents one of the initial or related search parameters; generating, by a processor, a matrix of hyperlinks within the multi-dimensional search space, each hyperlink having coordinates within the search space defining a relevance of the hyperlink to each of the initial and related search parameters; transmitting, for display to the user over the network, a graphical interface projecting the multi-dimensional search space, along with one or more user elements by which the user may adjust a relative weight of one or more of the initial and related search parameters by interacting with one or more of the hyperlinks; and transmitting, for display to the user over the network, a plurality of search results automatically updated in real time based on the user-adjusted weights of the initial and related search parameters.

According to additional embodiments of the present disclosure, a computer-implemented method is provided for enabling Internet users to interact with a graphical search interface, the method including: receiving, from a user over an electronic network, an initial search parameter; identifying, using a search engine database, a plurality of related search parameters, based on the received initial search parameter; generating, by a processor, a multi-dimensional search space having a perimeter defined by the initial and related search parameters; transmitting, for display to the user over the network, a graphical interface projecting the multi-dimensional search space, along with one or more user elements by which the user may adjust a relative weight of one or more of the initial and related search parameters; and transmitting, for display to the user over the network, a plurality of search results automatically updated in real time based on the user-adjusted weights of the initial and related search parameters.

The present disclosure provides a graphical interface between user and a database search algorithm or search engine. The interface provides the user an intuitive visualization of search parameter weighting hierarchy, as well as a means to manually reconfigure the weighting hierarchy. The graphical interface symbolically projects the parameter weighting hierarchy as a two or three dimensional "search space," whose center represents optimal search output. The shape of the "search space" is found to have 'n' vertices representing the 'n' parameters employed in the search. The relative distances of parameter vertices to the space center represent the relative weightings or importance of each parameter in the overall search. As a search is initiated, vertices are determined and populated either through search engine suggestions, default settings, or user definitions. In certain embodiments, initially, all parameters are weighted equally, represented as a radially symmetric shape about the optimal search output. Alternatively, neighboring vertices of two or more parameters may be assigned a higher order relative weighting if they are determined or designated by a user to be more related than other parameters. The interface presents the user the capability of reconfiguring the search by dragging individual parameters toward (increasing weight), away from (decreasing weight), or completely away from (eliminating parameter) the shape center. As the shape is manipulated in this fashion, optimal search results are updated in real time. Finally, the interface allows the user to simultaneously examine multiple data sets, searching for intersection by joining parameters common to each set, or union by joining "search spaces" of each set.

Additional embodiments and advantages will be set forth in part in the description which follows, and in part will be obvious from the description, or may be learned by practice of the disclosure. The embodiments and advantages will be realized and attained by means of the elements and combinations particularly pointed out below.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

It should be noted from the outset that the graphical user interface consistent with the present disclosure, and as explained in this description, may be employed with any database search algorithm or search engine capable of examining multiple search parameters in determining optimal match output.

The capability of the presently disclosed graphical search interface of visualizing and reorienting search engine output as specified by the user's goals, preferences, and needs can be illustrated through using a search for 'summer vacations' as an example.

Figure 1:
FIG. 1 depicts one example of a typical search engine output.

If the user was to enter the search parameter 'summer vacation' into Google's search engine, the output would be similar to the screen shot displayed in FIG. 1.

Figure 2:
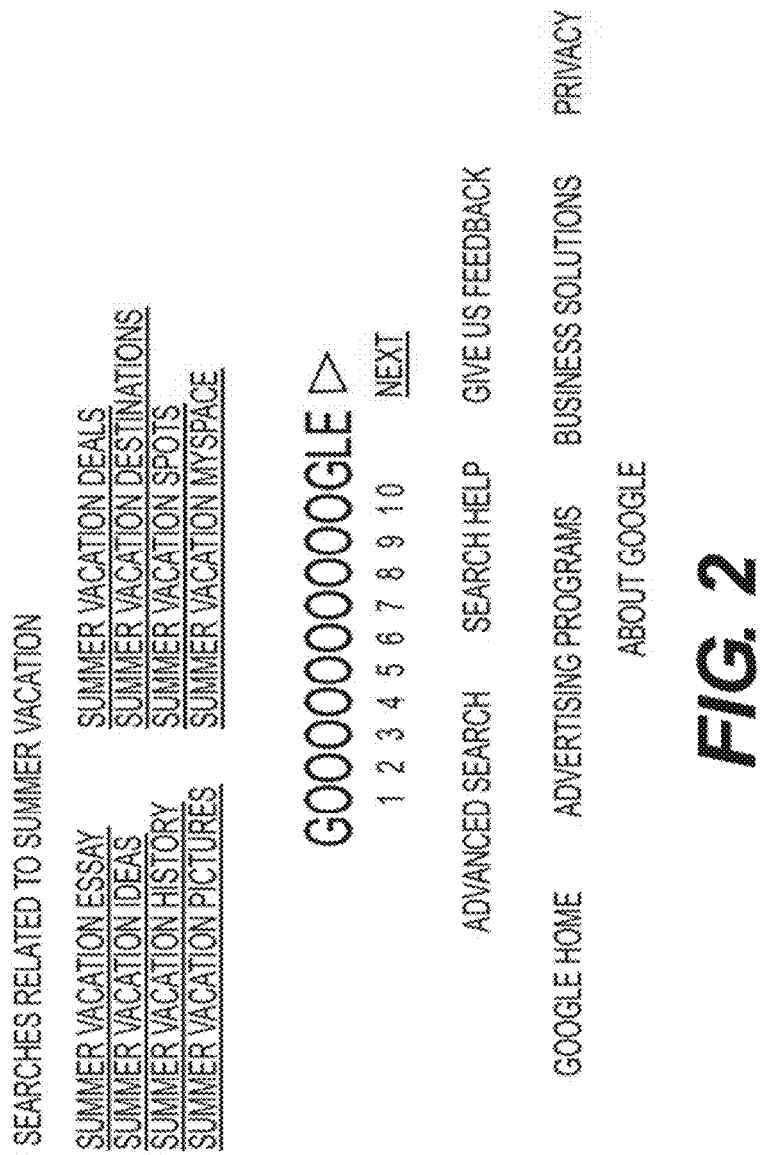
FIG. 2 depicts one example of a typical search engine related search suggestions output.

This output presents two issues that the present disclosure addresses: one, it is impersonal in the sense that it is a generic output that does not adequately address the users goals, preferences, or needs; and two, it displays the output in a list of hyperlinks potentially requiring the user to scan pages of information. In addition to these problems, the related searches that existing search engines produce at the bottom of the initial search output page are numerous and call for extensive cross referencing of search outputs in order to determine optimal results (FIG. 2).

Figure 3:
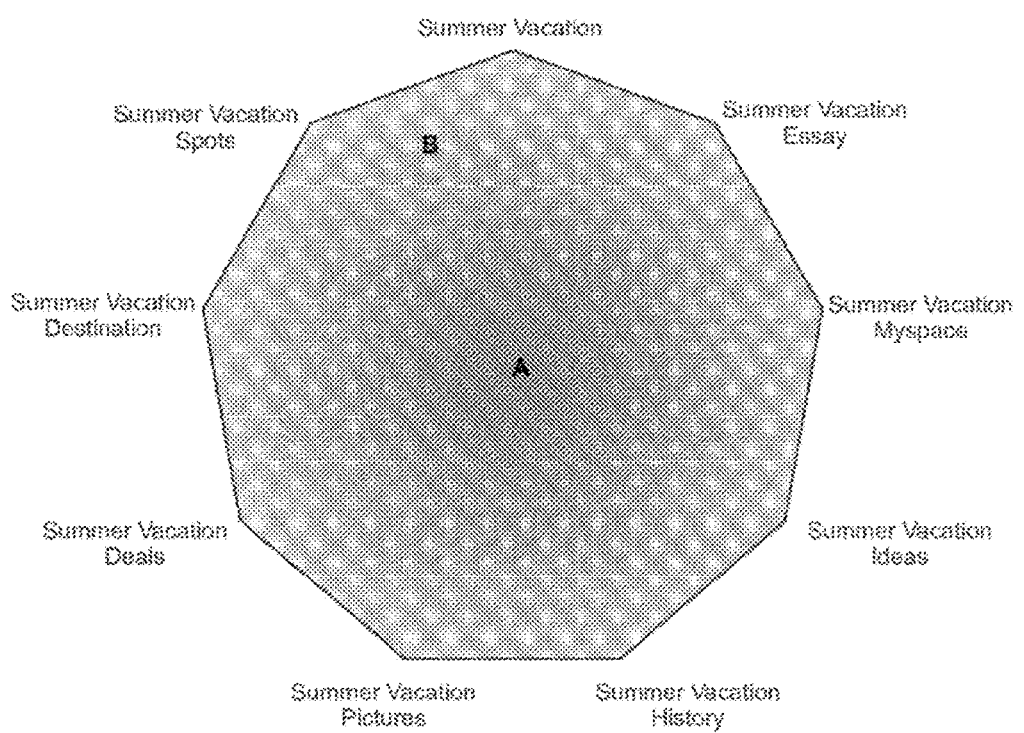
FIG. 3 depicts an exemplary "search space" two-dimensional projection with vertices populated with search suggestion output, consistent with the presently disclosed graphical search interface.
Figure 4:
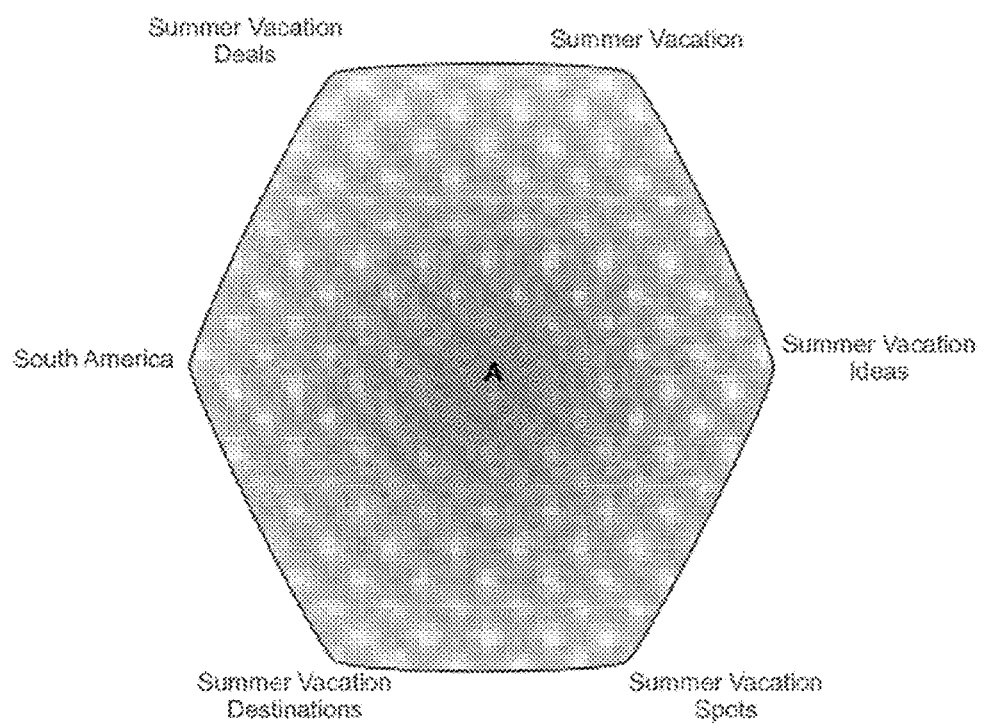
FIG. 4 depicts an exemplary reconfigured graphical "search space" projection, consistent with the presently disclosed graphical search interface.

The presently disclosed graphical search interface would provide the following graphical output immediately after the initial search parameter was entered as represented in FIG. 3. This initial graphical output projects a radially symmetric search space shape whose vertices are populated with the initial search parameter along with all related searches that are generated (FIG. 3). In one embodiment, the initial search parameters may be obtained in the input box where the user initially interfaces with the search technology. In one embodiment, parser modules may then use regexes to then define the search terms to understand the user search parameters. Once the computer processing device understands the search parameters, the search parameters may be extracted, and represented in the graphical search space. In one embodiment, this may be performed using a draw function in JavaScript that scales with the amount of words extracted by the parser modules. The draw function may create a geometric, equal-distanced shape with the vertices comprising the extracted user search terms.

Each vertex, then represents a search parameter. The maximum and minimum number of search parameters may be default or user defined. Contained within the search space shape is a matrix of hyperlinks related to all parameters. A given hyperlink's coordinates inside the search space are determined by its relevance to the search parameters. Nearer proximity represents higher relevance between hyperlink and search parameter. The middle region of the search space represents search output generated by equally weighting all search space parameters. Thus the center of the search space represents an optimal hit subset, most equally relevant to all search parameters—labeled 'A' in FIG. 3. However, as described above, the search parameters are not necessarily equally weighted. For instance, in certain embodiments, search parameters and the resulting search space may reflect a higher order relative weighting for two or more neighboring search parameters.

As described above, the graphical search space may be a Euclidean space that takes the spatial representation of the user's search parameters and derives from it coordinate points for each parameter. The coordinate point for each term may be determined using Euclidean geometry, assessing the point from two analytical frameworks: (1) how far is the point from the radial center of the graphical search space; and (2) how far away from the other search parameters is the point? The answer to the second analytical framework may create a relative association between the parameter in question, and the surrounding parameters. The relative association weighting may exist to describe the associative hierarchy existing amongst the user's search parameters in the graphical search space. Both the direct coordinate and the relative distances may be used to create a final parameter weighting that is assigned to the search parameter. Because these distances may be derived from a pair of Euclidean coordinate points from the underlying Euclidean geometry framework of the graphical search space, each of the distances may be translated into a decimal point weighting on a scale of 0 to 1.

In one embodiment, any movement of search parameters within the graphical search space may be captured within the spatial coordinate system and used to create the weight of the search parameters within the graphical search space. This may be a binary construct in that the weighting may be done in two parts, first, spatial distance between parameter and the radial center of the graphical search space, and second, the spatial distances and angles between parameters in the graphical search space. Within the first weighting construct, the closer the spatial distance between the parameter and the radial center, the greater the weighting applied to the search parameter. Within the second weighting construct, the spatial representation between the search parameters in the graphical search space may be captured using the distances and angles between parameters, applied within a Euclidean geometry framework. Thus the relative weightings of parameters may be derived as described above, which is useful to the construction of the weighting of search parameters. As an alternative embodiment, if the radial center were moved, the construction of the above discussed binary system would occur again, updating the previously derived weightings of the search parameters. The use of a spatial Euclidean geometric coordinate system may allow scalability and heightened configurability options, and may break user interaction within the graphical search space down into quantified numeric interactions within a pre-defined mathematical framework that allows for scale invariant use.

In one embodiment, a hyperlink within the database may be defined by its parameters of interest. These parameters of interest may then be used to create the framework for assigning the graphical interface weights to the hyperlinks. The parameters of interest defining the hyperlinks—or result options—within the database may correspond to the parsing modules that are used to extract user search parameters from the input box. Therefore, when a weight is derived from the graphical search space, it may be used to create a query call to the database. This query call may place the respective weights into the correct framework designations for the corresponding parameters of interest within the database. Once the weights are assigned into the database, an additional call may be performed to score each hyperlink on two criteria. First, does the hyperlink have the parsed parameters of interest? If yes—for each parameter, the value may be assigned a 1. If no, it may be assigned a 0. Next, the weights may be scored for each hyperlink. If the hyperlink scored a 1 for a parameter of interests in the first stage, the corresponding weight may then be multiplied against the 1. Once all scoring has been completed, the mathematical scores for all parameters of interests corresponding to the user's search and the hyperlink may be totaled, and the database may be sorted given the numerical scores for each hyperlink.

In one embodiment, a second weighting algorithm based on key-value arrays may be used. For example, a user search parameter, extracted and placed into the graphical search space in the same manner described above, may be representative of its key-value array in this algorithm. In other words, the parameter may be representative of all of its underlying characteristics and parameters of interest. Each characteristic or parameter of interest may be represented as a key-value pair. These key-value pairs may create an array that is connected to the user generated search parameter. When the user weights the individual search parameter, that weight may be cascaded across the underlying key-value array. When the key-value array is used to call the database for hyperlinks, the entirety of the key-value array may be used as the algorithm, and the weightings may all be sent as well. This weighting algorithm may allow for multi-dimensional weighting, and may be more efficient than assessing each parameter on a singular and isolated basis. Additionally, when more than one key-value array is populated in the graphical search space, the key value arrays may be matched and searched against one another, with the weightings generated by the user used as the mathematical system to assigning association and priority to the matching of key-value pairs amongst search parameters. This may allow for a much-improved weighting algorithm because it uses disparate data elements that may not have been initially associated to create enhanced clusters of associations with heightened signal. When the algorithm is sent into the database, it is a much more holistic method to extract relevant hyperlinks.

Figure 5:
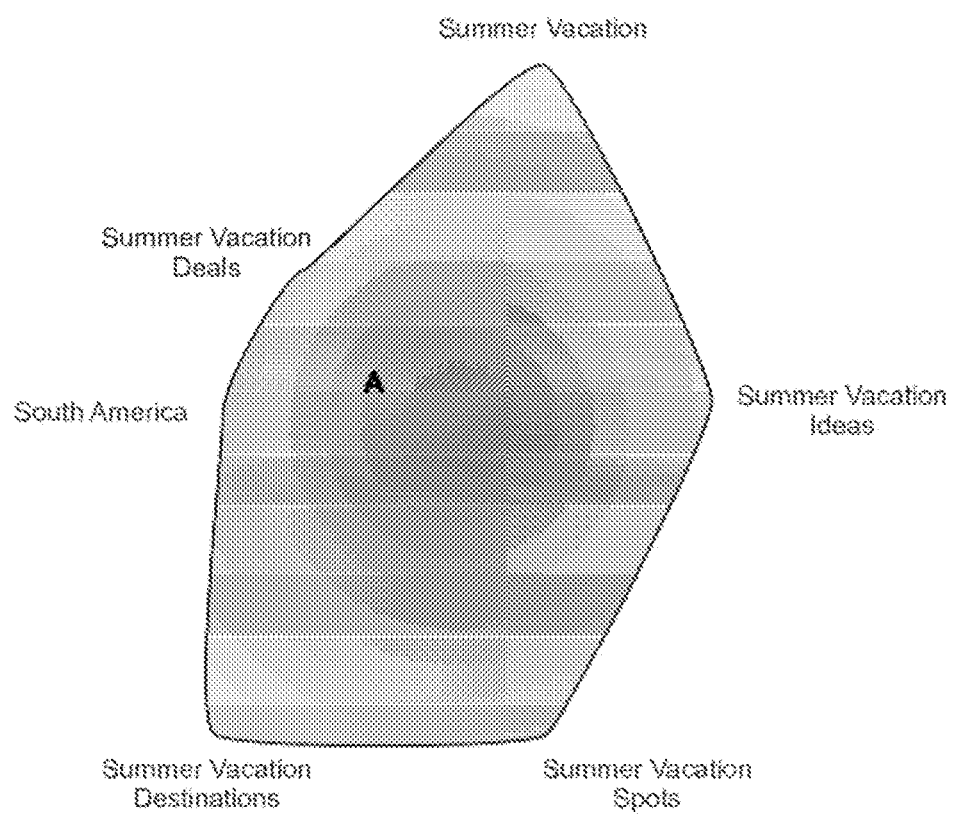
FIG. 5 depicts an exemplary "search space" projection weighting, e.g., vacation deals in South America, consistent with the presently disclosed graphical search interface.

In order to view a hyperlink contained within the graphic, the user simply highlights the point on the graphic that is in tune with his/her goals, preferences, and needs, and the interface will display a list of hyperlinks common to that search region. If the initial search space output does match the user's intentions, the interface presents the user the capability of reconfiguring the search by dragging individual parameters toward (increasing weight), away from (decreasing weight), or completely away from (eliminating parameter) the shape center (FIG. 5). As the search space dimensions are reconfigured, its coordinate system is continually repopulated with the updated hyperlink matrix. In this way, the presently disclosed graphical search interface allows for users to intuitively perform a search in unison with their mental criteria for what a successful search will generate. In one embodiment, the search parameter point within the graphical search space may be scaled in size proportionate to weighting that is being derived from the spatial distance between the search parameter and the radial center of the graphical search space. The size of the search parameter point may be increased on a linearly proportionate scale relative to the weighting. This increased size may describe intuitively to the user the increased significance he or she is expressing to the search engine. In another embodiment, the relative weighting of two parameters may be visually described by increasing the thickness of the line drawn to connect the two search parameters within the graphical search space. It is worth noting that no matter how many parameters entered into the graphical search space, the graphical search engine may construct a geometric shape within the graphical search space, with the respective search parameters represented by points, and the points connected to create a geometric shape. The increased thickness between two points may be linearly proportionate to the derived relative weighing that the user expresses to the search engine.

It should be noted at this point that two parameter cross-referencing search modes exist within the presently disclosed graphical search interface: quick search and web search. In the quick search mode, a parameter's relative radial distance to the center of the search space may be compared to the radial distance of other parameters. This mode enables quicker searching since the absolute order of parameters about the search space perimeter does not factor into the overall search. In web search mode, the search weight of a parameter is determined by its radial distance to the search space center, as well as distances to all other search parameters. This mode may involve reordering of parameter order, requiring additional interface time, though producing more parameter detailed output.

Figure 6:
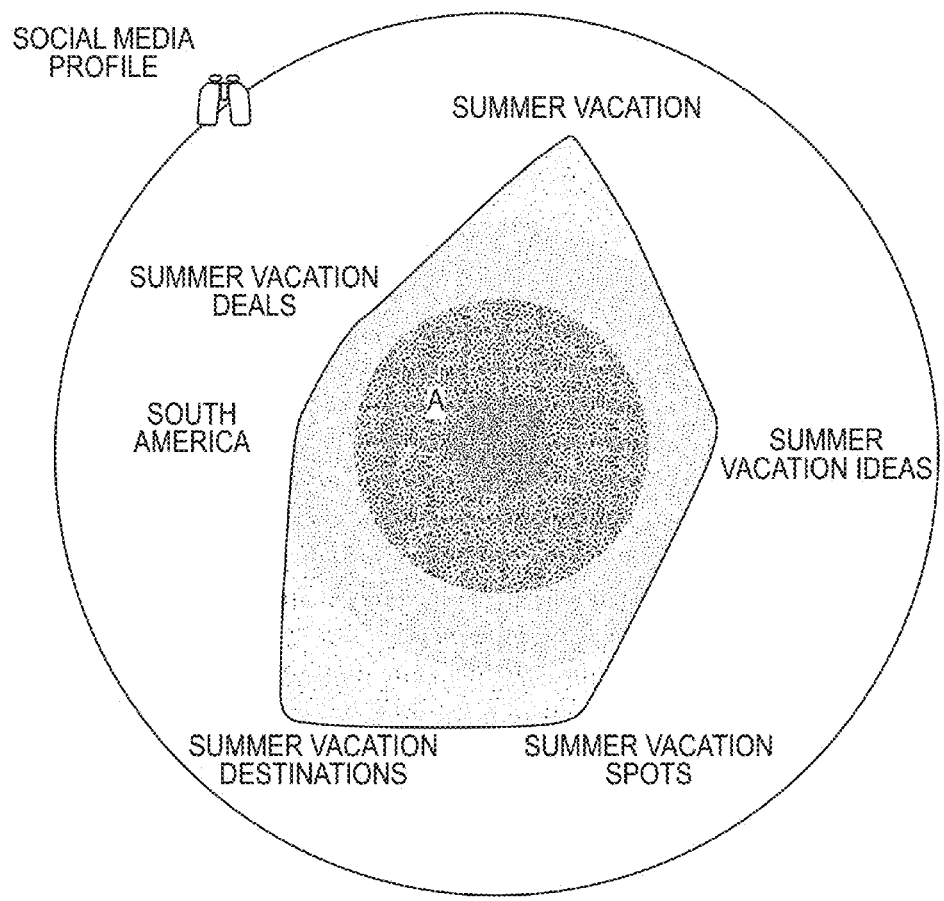
FIG. 6 depicts an exemplary "search space" projection for, e.g., summer vacation with social network profile applied in 'search within' mode, consistent with the presently disclosed graphical search interface.
Figure 7:
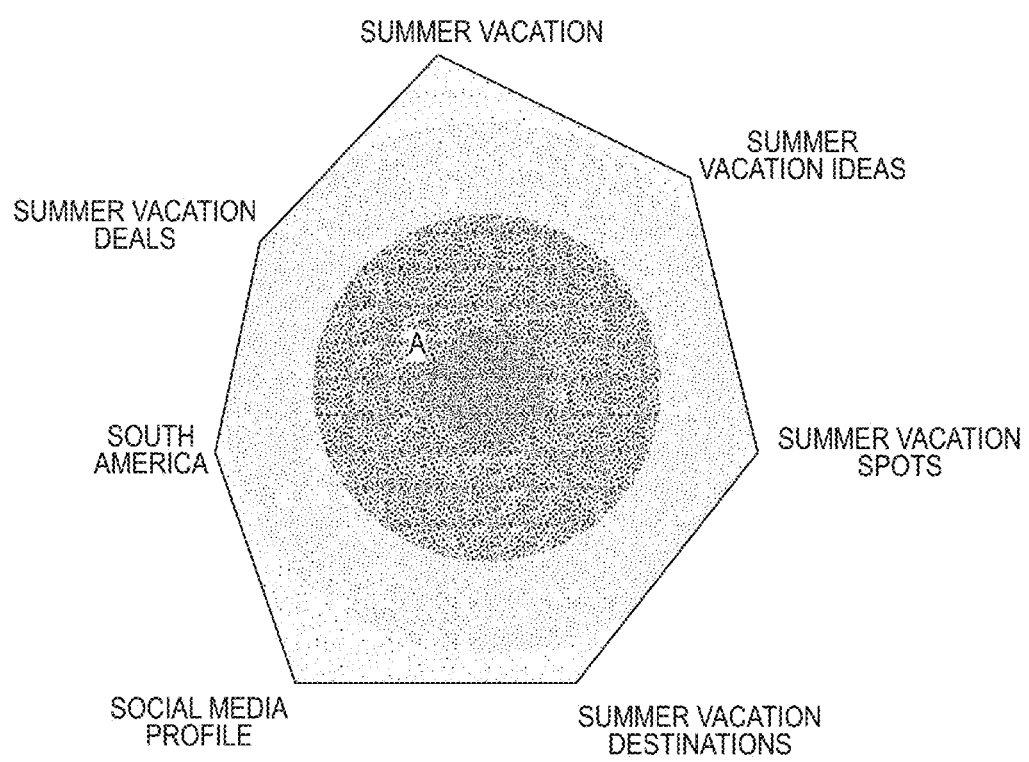
FIG. 7 depicts an exemplary "search space" projection for, e.g., summer vacation with social network profile applied in 'search beyond' mode, consistent with the presently disclosed graphical search interface.

Additionally, the presently disclosed graphical search interface provides a means for the user to intuitively perform searches across seeming non-compatible data bases. Comparing value preferences of a user's social network database, loosely considered intrinsic data, with extrinsic data sets, such as lists of films offered through a video streaming website may be performed as follows with the presently disclosed graphical search interface. Suppose the user would wish to conduct a search looking for a film based on how his social network preferences would value each of the search space initial search parameters; say, thriller films, foreign films, and films produced before the year 2000. To engage this 'search within' protocol, the user would simply encircle the graphical search space with the user's social network icon to search for hits within the network preferences (FIG. 6), such as within social network databases such as Facebook and Google+. If, on the other hand, the user wishes to include his/her social network preferences as an additional parameter to the search space, and 'search beyond' profile preferences, he/she would simply drag the social network icon inside of the search space, allowing it to populate along the search space perimeter—currently possible only through performing multiple searches and extensive cross referencing (FIG. 7). In either search, the user's final choice would update his/her value preferences of their network profile. The intricacies of these two search strategies create significant effects on a user's social network profile and, potentially, social behavior. Choices made through the 'search within' protocol, although comfortable to the user, and predictable to the marketer, provide no new social fodder, nothing new is added to the behavioral 'gene pool' of the user. Networks of this type become quickly saturated and stale of market potential. The 'search beyond' strategy provides the appeal of including personal preferences, while potentially introducing new information and diversifying social networks. Diverse social networks are more robust, adaptable to change, and provide a greater range of investment opportunities.

Figure 8:
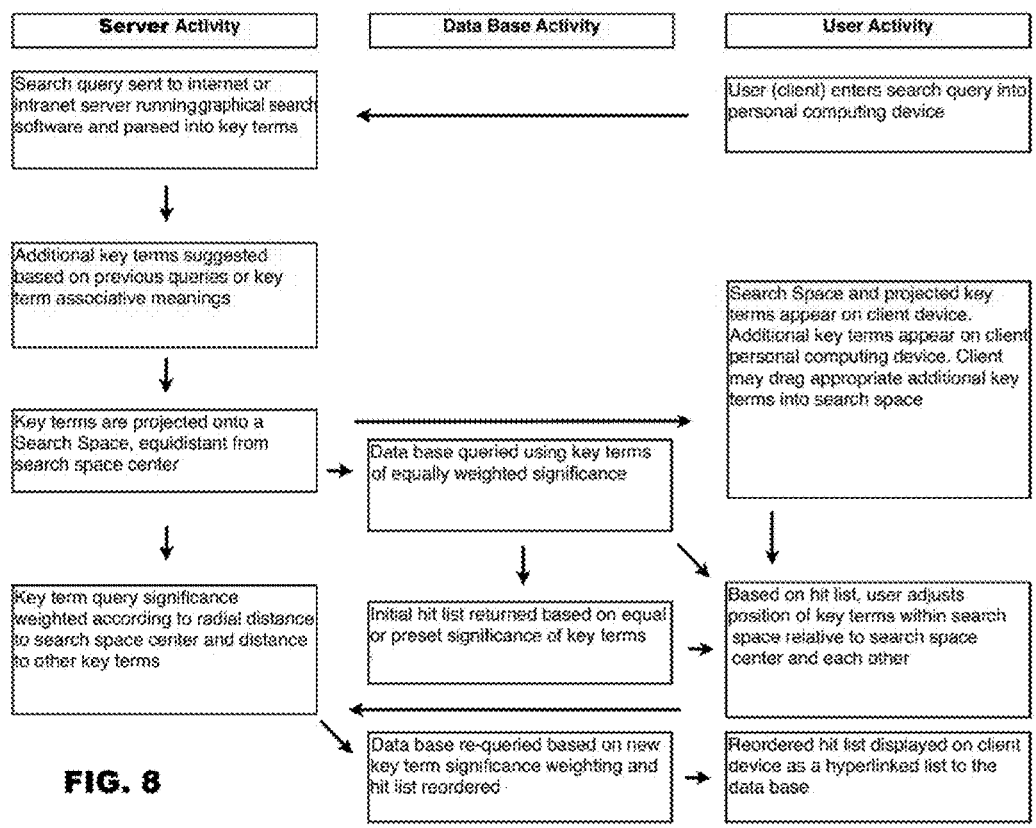
FIG. 8 depicts a block diagram of an exemplary method for enabling and using the presently disclosed graphical search interfaces.

FIG. 8 depicts a block diagram of an exemplary method for enabling and using the presently disclosed graphical search interfaces. Specifically, FIG. 8 depicts an exemplary method including user, database, and server activity. However, it should be appreciated that any of the depicted steps may be performed by any other of the user, database, and server, and that the depicted steps may be performed in any order. Moreover, the exemplary method may include additional steps not depicted, or may omit any of the depicted steps.

In one embodiment, the method of FIG. 8 may include the user (e.g., from a client device depicted in FIG. 9), entering a search query into a personal computing device. The search query may be sent to the Internet or intranet server running graphical search software, and parsed into key terms. In one embodiment, the graphical search server may suggest additional key terms based on previous queries and/or key term associative meanings, and then project key terms onto a search space, equidistant from a search space center. Since the search space and projected key terms (and optionally additional key terms) may appear on the client device, the client may drag appropriate additional key terms into the search space.

In addition, the method of FIG. 8 may include querying the database using key terms of equally weighted significance. The database and/or search server may return an initial hit list based on equal or preset significance of key terms. In certain embodiments, neighboring vertices of two or more parameters may be assigned a higher order relative weighting if they are determined or designated by a user to be more related than other parameters. Based on the hit list, the user may adjust a position of key terms within the search space relative to the search space center and/or each other. Meanwhile, the graphical search server may weight key term query significance according to radial distance to search space center and distance to other key terms.

As the user adjusts the relative position of key terms within the search space, and the server updates weights of key terms according to their distances, the database may be re-queried based on the updated key term significance weightings and the hit list may be re-ordered. The re-ordered hit list may then be displayed on the client device as a hyperlinked list to the database.

Figure 9:
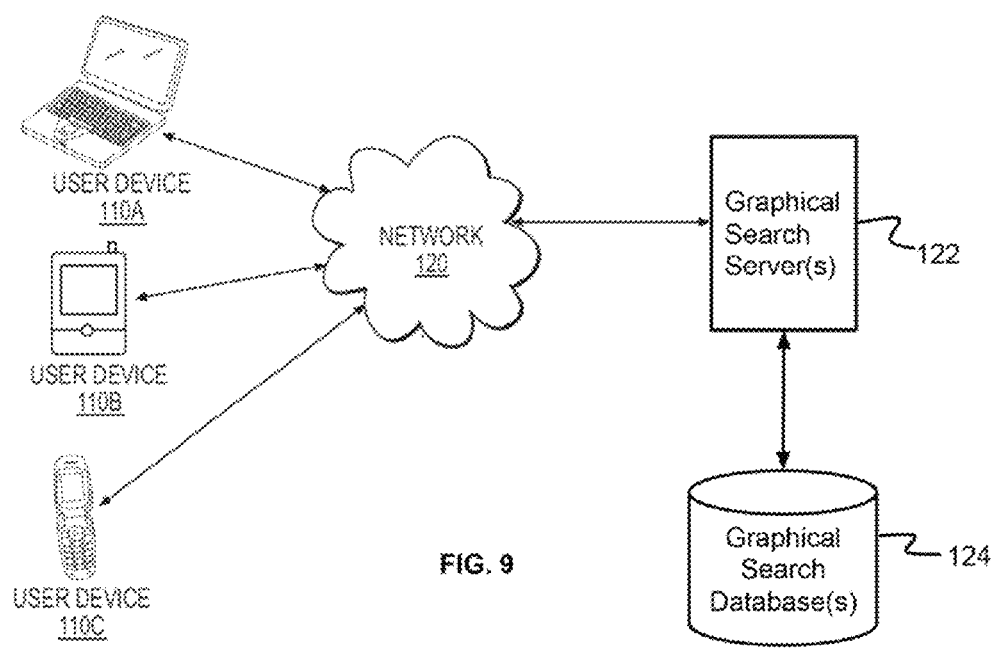
FIG. 9 depicts an exemplary environment and systems for enabling and using the presently disclosed graphical search interfaces.

FIG. 9 depicts an exemplary environment and systems for enabling and using the presently disclosed graphical search interfaces. Any user device 110a may be a desktop, laptop, or other type of personal computer, user device 110b may be a tablet device or other type of mobile computing device having a touchscreen display, and user device 110c may be a mobile device, smartphone, and/or personal digital assistant ("PDA"). However, it should be noted that each of user devices 110a, 110b and 110c may be any type of electronic device configured to send and receive data, such as search results, websites, multimedia content, and electronic advertisements, over a network 120. Examples of such mobile computing devices include, but are not limited to, a laptop computer, a handheld computer, a personal digital assistant (PDA), a cellular telephone, a network appliance, a camera, a smart phone, an enhanced general packet radio service (EG-PRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Graphical search server(s) 122 may be configured to interact with user devices 110a-110c over network 120 to execute the exemplary method of FIG. 8. Graphical search server(s) 122 may each represent any of various types of servers including, but not limited to a web server, an application server, a proxy server, a network server, or a server farm. Graphical search server(s) 122 may be implemented using any general-purpose computer capable of serving data to other computing devices including, but not limited to, user devices 110a, 110b, 110c or any other computing device (not shown) via network 120. Such a general-purpose computer can include, but is not limited to, a server device having a processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. Each server may also have multiple processors and multiple shared or separate memory components that are configured to function together within, for example, a clustered computing environment or server farm. Graphical search server(s) 122 may be configured to interact with one or more database(s) 124, which may be any suitable type of distributed, local, and/or cloud-based data storage devices that can store indexed data, such as keywords, websites, etc., or any other data consistent with an online search engine database.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to applications for mobile applications, it should be appreciated that the presently disclosed embodiments may be applicable to any environment, such as a desktop or laptop computer, an automobile entertainment system, a home entertainment system, etc. Also, as previously noted, the presently disclosed embodiments may be applicable to any type of content, such as text content or video content.

The foregoing description has been presented for purposes of illustration and description. It is not intended to be exhaustive or to limit the disclosure to the precise form disclosed, and other modifications and variations may be possible in light of the above teachings. The embodiments were chosen and described in order to best explain the principles of the disclosure and its practical application to thereby enable others skilled in the art to best utilize the disclosure in various embodiments and various modifications as are suited to the particular use contemplated.

What is claimed is:

1. A computer-implemented method for enabling Internet users to interact with a graphical search interface, the method comprising:
   receiving, from a user over an electronic network, an initial search parameter;
   identifying, using a search engine database, a plurality of related search parameters, based on the received initial search parameter;

generating, by a processor, a multi-dimensional search space, based on the initial and related search parameters, wherein the multi-dimensional search space has a perimeter defined by the initial and related search parameters;

transmitting, for display to the user over the network, a graphical interface displaying the multi-dimensional search space, along with one or more user elements by which the user may adjust a weighting of one or more of the initial and related search parameters by interacting with the one or more user elements, wherein the weighting of each of the initial and related search parameters is calculated based on both of (i) a spatial distance between each of the one or more initial and related search parameters of the perimeter and a radial center of the multi-dimensional search space;

and (ii) a spatial distance and an angle between two or more of each of the one or more initial and related search parameters of the perimeter; and transmitting, for display to the user over the network, a plurality of search results automatically updated in real time based on the user-adjusted weighting of the initial and related search parameters.

2. The computer-implemented method of claim 1, further comprising:

enabling the user to change the weighting of one or more of the initial and related search parameters by using the one or more user elements to change a spatial position of one or more of the initial and related search parameters relative to each other.

3. The computer-implemented method of claim 1, wherein the weighting of each of the initial and related search parameters is calculated based on a direct weighting and a relative weighting;

wherein the direct weighting is calculated based on either (i) a position of each of the one or more initial and related search parameters of the perimeter, or (ii) a distance of each of the one or more initial and related search parameters of the perimeter from a radial center of the multi-dimensional search space; and wherein the relative weighting is calculated based on a distance of each of the one or more initial and related search parameters of the perimeter to one or more of other user elements.

4. The computer-implemented method of claim 3, wherein the direct weighting and the relative weighting are derived from Euclidean coordinate points underlying the one or more initial and related search parameters of the perimeter.

5. The computer-implemented method of claim 1, wherein the spatial distance and the angle are calculated between two or more of each of the one or more initial and related search parameters of the perimeter using a Euclidean geometry framework.

6. The computer-implemented method of claim 1, further comprising:

generating, by a processor, a matrix of hyperlinks within the multi-dimensional search space, each hyperlink having coordinates within the search space defining a relevance of each hyperlink to the initial and related search parameters.

7. The computer-implemented method of claim 1, further comprising:

presenting, to the user over the network, the one or more user elements, such that the user can move each of the one or more user elements toward or away from a center and other user elements of the multi-dimensional search space to change a relative weight of one or more of the initial and related search parameters.

8. The computer-implemented method of claim 1, wherein the perimeter of the multi-dimensional search space has a plurality of vertices, each vertex of the plurality of vertices representing one of the related search parameters employed in a search initiated by the user.

9. The computer-implemented method of claim 1, wherein each of the one or more user elements is a vertex of a plurality of parameter vertices in the multi-dimensional search space, and collective positions of parameter vertices to other vertices of the multi-dimensional search space represent the relative weightings or importance of each parameter in a user Internet search.

10. The computer-implemented method of claim 1, wherein each of the one or more user elements is a vertex of a plurality of parameter vertices in the multi-dimensional search space, and collective distances of parameter vertices to other vertices of the multi-dimensional search space represent the relative weightings or importance of each parameter in a user Internet search.

11. The computer-implemented method of claim 1, wherein the multi-dimensional search space has a center representing an optimal search output.

12. The computer-implemented method of claim 1, wherein, initially, the initial and related search parameters are weighted equally, such that the multi-dimensional search space is a radially symmetric shape about an optimal search output.

13. The computer-implemented method of claim 1, further comprising:

enabling the user to simultaneously examine multiple data sets; and searching for an intersection by joining parameters common to each data set, by joining search spaces of each data set.

14. A computer-implemented method for enabling Internet users to interact with a graphical search interface, the method comprising:

receiving, from a user over an electronic network, an initial search parameter;

generating, using a search engine database, a plurality of related search parameters, based on the received initial search parameter;

generating, by a processor, a multi-dimensional search space having a plurality of vertices, based on the initial and related search parameters, wherein each vertex is populated with and represents one of the initial or related search parameters;

generating, by a processor, a matrix of hyperlinks within the multi-dimensional search space, each hyperlink having coordinates within the search space defining a relevance of the hyperlink to each of the initial and related search parameters;

transmitting, for display to the user over the network, a graphical interface displaying the multi-dimensional search space, along with one or more user elements by which the user may adjust a relative weight of one or more of the initial and related search parameters by interacting with one or more of the hyperlinks, wherein the weighting of each of the initial and related search parameters is calculated based on both of (i) a spatial distance between each of the one or more initial and related search parameters of the perimeter and a radial center of the multi-dimensional search space; and (ii) a spatial distance and an angle between two or more of each of the one or more initial and related search parameters of the perimeter; and transmitting, for display to the user over the network, a plurality of search results automatically updated in real time based on the user-adjusted weights of the initial and related search parameters.

15. The computer-implemented method of claim 14, further comprising:
presenting, to the user over the network, the one or more user elements, such that the user can move each of the one or more user elements toward or away from a center and other user elements of the multi-dimensional search space to change a relative weight of one or more of the initial and related search parameters.

16. The computer-implemented method of claim 14, wherein the multi-dimensional search space has 'n' vertices representing 'n' parameters employed in a search initiated by the user.

17. The computer-implemented method of claim 14, wherein each of the one or more user elements is a vertex of the plurality of vertices, and the position of each vertex relative to the center and other vertices within the multi-dimensional search space represent the relative weightings or importance of each parameter in a user Internet search.

18. The computer-implemented method of claim 14, wherein the multi-dimensional search space has a center representing an optimal search output.

19. A computer-implemented method for enabling Internet users to interact with a graphical search interface, the method comprising:
receiving, from a user over an electronic network, an initial search parameter;
identifying, using a search engine database, a plurality of related search parameters, based on the received initial search parameter;
generating, by a processor, a multi-dimensional search space having a perimeter defined by the initial and related search parameters;
transmitting, for display to the user over the network, a graphical interface displaying the multi-dimensional search space, along with one or more user elements by which the user may adjust a relative weight of one or more of the initial and related search parameters, wherein the relative weight of each of the initial and related search parameters is calculated based on both of (i) a spatial distance between each of the one or more initial and related search parameters of the perimeter and a radial center of the multi-dimensional search space; and (ii) a spatial distance and an angle between two or more of each of the one or more initial and related search parameters of the perimeter; and
transmitting, for display to the user over the network, a plurality of search results automatically updated in real time based on the user-adjusted weights of the initial and related search parameters.

* * * * *